United States Patent [19]

Godden

[11] Patent Number: 4,780,018
[45] Date of Patent: Oct. 25, 1988

[54] FRAMEWORK CONNECTOR

[76] Inventor: Braden C. Godden, 10 Bocking End, Braintree, Essex CM7 6AA, England

[21] Appl. No.: 24,356

[22] Filed: Mar. 10, 1987

[30] Foreign Application Priority Data

Mar. 13, 1986 [GB] United Kingdom ............... 8606236
Oct. 21, 1986 [GB] United Kingdom ............... 8625176

[51] Int. Cl.$^4$ ............................................. F16D 1/00
[52] U.S. Cl. .................................. 403/173; 403/292; 403/296
[58] Field of Search ............ 403/296, 298, 292, 173; 446/122, 123

[56] References Cited

U.S. PATENT DOCUMENTS

| | | | |
|---|---|---|---|
| 803,420 | 10/1905 | Koegel | 403/296 X |
| 1,216,840 | 2/1917 | Ramsey | 446/122 |
| 1,294,446 | 2/1919 | Greenstreet | 446/122 |
| 1,400,066 | 12/1921 | Huck | 446/123 |
| 2,263,050 | 11/1941 | Rein | 403/296 X |
| 3,314,699 | 4/1967 | Taylor | 403/173 X |
| 3,864,051 | 2/1975 | Reid | 403/292 X |
| 3,883,258 | 5/1975 | Hewson | 403/298 |
| 4,012,153 | 3/1977 | Pidgeon et al. | 403/296 X |
| 4,079,541 | 3/1978 | Hogan | 446/122 |

FOREIGN PATENT DOCUMENTS

| | | |
|---|---|---|
| 1554362 | 11/1969 | Fed. Rep. of Germany . |
| 8019765 | 10/1980 | Fed. Rep. of Germany . |
| 1304766 | 8/1962 | France . |
| 1368243 | 6/1964 | France . |
| 2497547 | 7/1982 | France . |
| 1008031 | 10/1965 | United Kingdom . |
| 1086885 | 10/1967 | United Kingdom . |
| 1500537 | 2/1978 | United Kingdom . |
| 2034186A | 6/1980 | United Kingdom . |
| 1569580 | 6/1980 | United Kingdom . |

Primary Examiner—Andrew V. Kundrat
Attorney, Agent, or Firm—Thomas E. Sisson

[57] ABSTRACT

As shown in FIG. 3, a connector comprises a body (1) and a plurality of detachable connecting members for connecting the body (1) to a rod or tube, wherein the body (1) is provided with a plurality of threaded apertures (11) for receiving threaded end portions of the connecting members. The connecting members are form-locked to the connector body (1) to prevent relative rotation, by means of a hexagon head solid with the connecting member and received in a corresponding recess (12) in the connector body (1), thus preventing relative rotation between the connector body (1) and connecting member (31). In a preferred form, the connector body (1) is a pentagonal prism having two pairs of adjacent faces (4,5;6,7) at 90° and the remaining three pairs (5,6;7,8;8;4) at 120°.

2 Claims, 4 Drawing Sheets

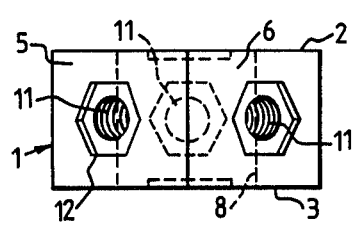
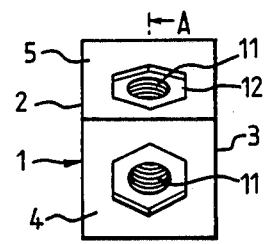
FIG.1.  FIG.2.
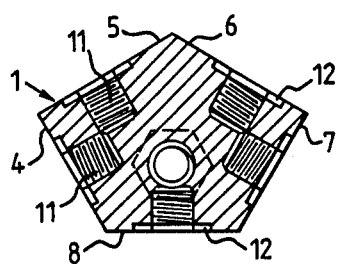
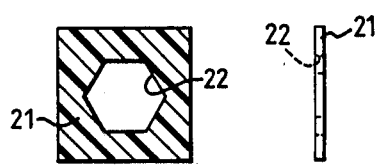
FIG.3.  FIG.4.  FIG.4a.
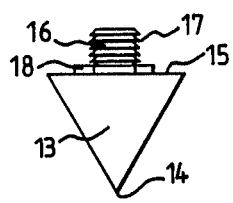
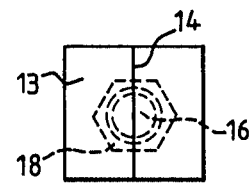
FIG.5.  FIG.6.
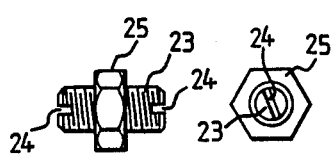
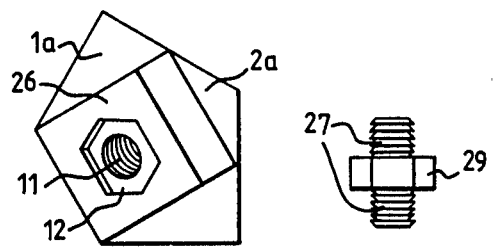
FIG.7.  FIG.8.  FIG.9.  FIG.10.

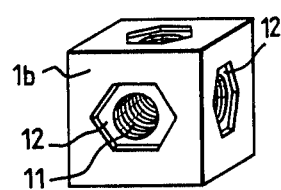
FIG.11.
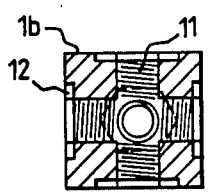
FIG.12.
FIG.17.
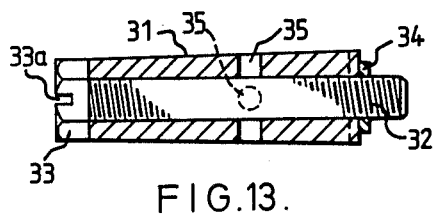
FIG.13.
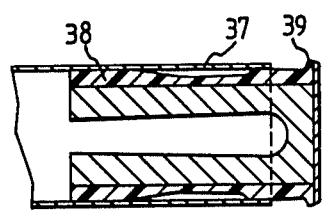
FIG.14.
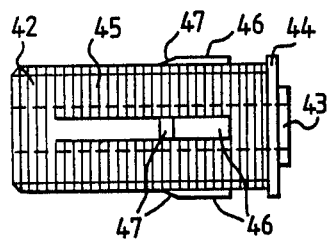
FIG.15.
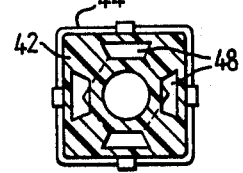
FIG.16.
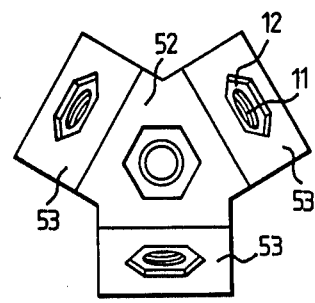
FIG.18.
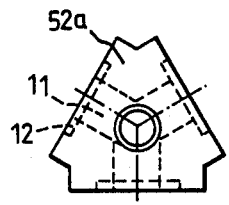
FIG.18a.
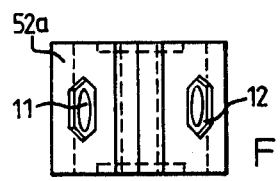
FIG.18b.
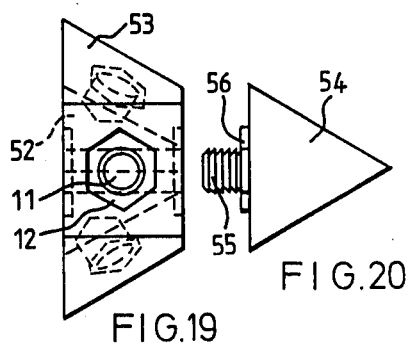
FIG.19
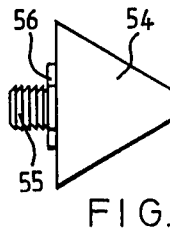
FIG.20

FRAMEWORK CONNECTOR

FIELD OF THE INVENTION

The present invention relates to multi-purpose framework systems in which frameworks of various sizes can be built up using a number of metal or plastic tubes or rods and suitable connectors. Such framework systems have many uses, eg in supplying structural frameworks for furniture and fittings, roof structures, for display stands of all sizes, for lighting gantries and for pylons.

REVIEW OF THE PRIOR ART

One commonly used system is the Dexion Speedframe (trade mark) system, which utilises lengths of square cross-section metal tubing which are connected by means of a limited range of connectors each comprising a central body having two or more projections which are inserted into the ends of lengths of tubes to form a joint therebetween. The range of connectors include 90°, T joints and corner joints, all requiring tubes to be joined at right angles. This use of right angles entails that the frameworks are of rectangular configuration.

The provision of a wider range of connectors is made difficult by the need to provide projections for all the required angles and so to provide a connector which is dedicated to a particular type of joint.

British Pat. No. 1008031 shows a framework system having a range of connectors which may each be used to form joints between tubing at a variety of angles, and so broaden the range of shapes which may be made and extend the use of such systems to new applications. This system is based on the use of a block having multiple facets with threaded holes to receive a stud passing through a bush to be inserted into a tube to be supported. In this arrangement, the tube and bush may rotate relative to the block, which in many arrangements, particularly those involving square tubing, is very disadvantageous.

OBJECT OF THE INVENTION

It is an object of the present invention to avoid this disadvantage, and this is achieved by form-locking the block, otherwise referred to as a connector body, to the stud or connecting member which enters the tube.

It is a further object of the invention to provide a range of connector bodies which may be combined one with another to build up composite connector bodies of a wide variety of forms.

SUMMARY OF THE INVENTION

According to a first aspect of the present invention, there is provided a connector comprising a body and a plurality of detachable connecting members for connecting the body to a rod or tube, wherein the body portion is provided with a plurality of threaded apertures for receiving threaded end portions of the connecting members, characterized in that the connecting members are form-locked to the connector body to prevent relative rotation.

Preferably, the form-locking is achieved by means of a hexagon head surrounding the threaded end portion and carried by the connecting member and received in a corresponding recess in the connector body, thus preventing relative rotation between the connector body and connecting member. The hexagon head may be a nut captive in or integral with the connecting member, or it may be engaged in mating recesses in both the connector body and connecting member.

The connecting members may each have an axial aperture for receiving a screw which projects out past the end of the connecting member to constitute the threaded end portion and connect to the body portion.

A connector body may be cubic, but in order to accommodate a variety of angles, it may comprise a right cylindrical prism having at least two adjacent faces which are not at right angles, for example, use may be made of triangles, particularly equilateral triangles, pentagons and regular hexagons, including hemi-hexagons.

In building up a composite connector body, a further connector body may be deemed to be a connecting member for connecting the body to a rod or tube.

One specific form of prism is a pentagonal prism having two pairs of adjacent side faces at 90° and the remaining three pairs at 120°.

In accordance with a second aspect of the invention, there is provided a connector body comprising a right pentagonal prism, characterised in that two pairs of adjacent side faces are at 90° and the remaining three pairs are at 120°, the faces of the prism having apertures to receive removable connecting members.

A triangular prism portion may be integrally formed on at least one end face of a cubic or pentagonal prism.

In accordance with a third aspect of the invention, there is provided a composite connector body comprising a connector body as described above, connected face to face, using the connection apertures, with a second compatible connector body.

The second connector body may be similar to the first, or it may be of a different shape, for example, in the form of a triangular prism portion.

The connector bodies may be joined by double-ended connectors.

The connecting members are normally readily removable from the apertures, and arranged to be inserted into the end of a length of tube. The members may be made of resilient material arranged to grip the inside walls of the tube, or an insert may be provided to fix between the connecting member and tube to form an interference connection therebetween.

Preferably, when using a 1 inch (25 mm) square face as the module, the threaded connections are based on 5/16 inch (8 mm) nuts and bolts. Inserts may be provided to blank off apertures not in use. Other ranges of sizes may be used as required.

The present invention finds particular application with Dexion Speed Frame.

BRIEF DESCRIPTION OF THE DRAWINGS

The invention will be further described by way of example with reference to the accompanying drawings, in which:

FIG. 1 is one elevation of a pentagonal connector body;
FIG. 2 is another elevation of the body of FIG. 1;
FIG. 3 is a section taken on the line A—A of FIG. 2;
FIG. 4 is an elevation of a spacer;
FIG. 4a is a side elevation of the spacer of FIG. 4;
FIG. 5 is an elevation of a plastic end cap;
FIG. 6 is another elevation of the end cap of FIG. 5;
FIG. 7 is a side elevation of an arrangement for joining two connector bodies;

FIG. 8 is an end elevation of the joining member of FIG. 6;

FIG. 9 is an elevation showing a modified form of connector body;

FIG. 10 is an elevation of a double-ended form of joining member;

FIG. 11 is a perspective view of a cubic connector body;

FIG. 12 is a sectional view of the connector body of FIG. 11;

FIG. 13 is a sectional view of a connecting member;

FIG. 14 is a sectional view of the end of a piece of tubing with an insert to receive the connecting member of FIG. 13;

FIG. 15 is a side elevation of a modified form of connecting member or post;

FIG. 16 is a sectional view of such a post;

FIG. 17 is a perspective view of a plastic plug;

FIGS. 18 and 19 are elevations of a further form of connector body;

FIG. 18a and 18b show a version of part of FIG. 18 constituting another form of connector body;

FIGS. 20 and 21 show an end cap for such a body;

PARTICULAR DESCRIPTION OF THE DRAWINGS

Figure 21:
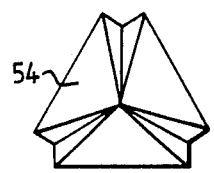

In the embodiments described, the system is based on a 1 inch (25 mm) module, and uses threaded connections and hexagon heads based on 5/16 inch (8 mm) nuts and bolts. However, it will be understood that these sizes are not limitative, and may be increased or decreased, with due regard to the strength required, as necessary.

Turning first to FIGS. 1 to 3, these show a connector body 1 in the form of a right prism of pentagonal section so as to present two end faces 2 and 3 and five side faces 4, 5, 6, 7 and 8.

The pairs of faces 4,5 and 6,7 are at right angles to each other while the pairs of faces 5,6; 7,8 and 8,4 are at 120°.

The system described is based on a one inch (25 mm) module, and the faces 4, 7 and 8 are thus 1 inch (25 mm) square, while the faces 5 and 6 are some 15% longer in the perimetral direction.

Each face 2, 3, 4, 5, 6, 7 and 8 has a threaded hole 11 therein, and coaxially with each hole 11 there is located a hexagonal recess 12 for form-locking connection to a post connector to be described in more detail hereinafter.

The holes 11 and recesses 12 may also be used for connection to similar or compatible connector bodies, and unused holes may be provided with end caps (see FIGS. 5 and 6) or plugs (see FIG. 15).

FIGS. 4 and 4a show a spacer 21 of plastics material having a hexagonal cut-out 22. This spacer is designed to be placed between two connector bodies which are being joined together by a joining arrangement as shown in FIGS. 7 and 8 or by a double-ended joining member as shown in FIG. 10.

FIGS. 5 and 6 show a form of moulded plastics end cap which will fit particularly well into the hole 11 in the face 8. The end cap comprises a prismatic body 13 having an apex 14. From a base 15 of the body 13 there projects a plastics spigot 16 provided with sawtooth mouldings or barbs 17, and a hexagonal zone 18 is designed to fit into the recess 12 for form-locking as the spigot 16 is pressed with interference into the hole 11 so that the barbs engage on the threads and resist withdrawal of the cap.

In order to build up a composite connector body, the apertures 11 and recesses 12 may be used to join two connector bodies face to face, with or without interposition of a spacer as as shown in FIGS. 4 and 4a. FIGS. 7 and 8 show a form of joining member in the form of a grub screw 23 with a screwdriver slot 24 in each end, to be used with a hexagonal steel nut 25. Such a joining arrangement is to be used where great structural strength is required and it is feasible to provide relative rotation of the connector bodies.

If required, spacers 21 as shown in FIGS. 4 and 4a may be interposed between the adjacent connector bodies, with the hexagonal cut out 22 fitting snugly over the nut 25. Where no spacer is used, the nut may be thinner, e.g. 4 mm thick instead of 6 mm.

FIG. 9 shows a modified form of connector body 1a, which is essentially the same as the body 1, except that one or both of the end faces 2a is extended by having an integral 60°/30° prism portion 26 thereon, with a threaded aperture 11 and hexagonal recess 12 formed on one face. This further increases the number of angle combinations which may be made up. The prism portion need not be integral with the body 1a, but could be formed by adding a connector body in the form of the appropriate prism, to form a composite connector body using a joining arrangement as described.

Also, alternative forms of prism, e.g. 45° isoceles prisms, may be used if desired.

FIG. 10 shows a one-piece double-ended joining member for linking two connector bodies. It is moulded in plastics material and includes two lengths 27 formed with saw-tooth configurations to provide a push interference fit on the threads in the apertures 11 in the connector bodies. Between the lenths 27 there is an integrally moulded hexagon 29 which engages in the recesses 12 in both bodies to form lock the bodies together.

Again, spacers may be interposed as desired and may be used to counter the form-locking in order to provide relative rotation if required.

FIGS. 11 and 12 show a connector body 1b in the form of a 1 inch (25 mm) cube having a threaded aperture 11 and hexagonal recess 12 in each of its six faces. Such a connector body 1b may be used to build up a framework on a rectangular basis, and in combination with other forms of connector bodies, joined to it as previously described, a wide variety of shapes may be built up.

FIG. 13 shows a post connector comprising a hollow tapering body 31 freely receiving an axial bolt 32 having a hexagon head 33, with a screwdriver slot 33a, arranged to abut one end of the body 31. At the opposite end, the bolt passes freely through a hexagon shape 34 solid with the body 31 and adapted to fit snugly into a recess 12. To assemble a post connector with a connector body, the hexagon shape 34 is introduced into the recess 12 around the aperture 11 to be used, and the bolt 32 tightened up into the aperture 11 by engagement on the threads therein and by use of the slot 33a. Once tight, the body is form-locked to the connector body 1, 1a or 1b. For further security, the bolt 32 may be locked directly to the body 31 by a grub screw or pin introduced into a radial aperture 35.

Once the required post connectors are on the connector body, they may be introduced into the ends of plastics or metal tubes.

FIG. 14 shows one end of a tube 37 having a somewhat resilient plastics insert 38 pushed almost home therein. In use, the insert would be pushed in until a flange 39 abutted the tube end, and the tapered post connector would then be introduced into the insert and pushed, and possibly otherwise forced, in as far as possible to provide a structural connection.

Two or more tubes could thus be joined together at required angles, including the possibility of 180°, in which one tube is in continuation of another.

The joining procedure is the same whether the junction is formed by a single connector body 1, 1a or 1b, or by a composite one formed by linking two or more connector bodies as hereinbefore described.

FIGS. 15 and 16 show an alternative form of post for connecting to a tube. The connecting post is in the form of a body 42 of rubber or other elastomer of a section to fit snugly in a square tube, although other shapes are possible. Axially, the body 42 is hollowed to receive a bolt, not illustrated but similar to the bolt 32, which passes through a hexagon configuration 43 and into an aperture 11 for form-locking engagement as before. The hexagon 43 is part of an end plate 44 which forms a shoulder to abut the tube end. The body 42 is formed with ribs 45 for interference fitting with the tube, and in addition, locking is provided by lugs 46, chamfered at 47, engaging in slots in the wall of the tube as the post is pushed or otherwise forced home. The lugs 46 spring out on reaching the end of the slot and prevent withdrawal of the post from the tube. If withdrawal is required, the lugs 46 may be manually depressed until held down by the tube wall. For this purpose, the body is provided with internal cavities 48 behind the lugs 46.

For aesthetic reasons, and to inhibit tampering with joints, unused apertures 11 may be blocked off by plastics caps 51 as shown in FIG. 17. The cap illustrated is a moulded hexagon head to fit into a recess 12, and, if required, it may have an integral stem with saw tooth configurations to engage the threads in the aperture 11.

FIGS. 18 and 19 show a connector body in the form of a right equilateral triangular prism 52 (with the apices cut away) having a further prism 53 on each side face. In the particular example illustrated, the prisms 53 are shown in FIG. 19 to be right angled with the other angles 30° and 60°. The aperture 11 and recesses 12 are shown on some of the faces, and may be provided on some or all of the faces. This form of body is useful for forming pyramidal structures, and the apex may be finished with an end cap 54, as shown in FIGS. 20 and 21, with an integral spigot 55, with saw-tooth configuration, and hexagon portion 56 for introduction into the appropriate aperture 11 and recess 12.

Figure 22:
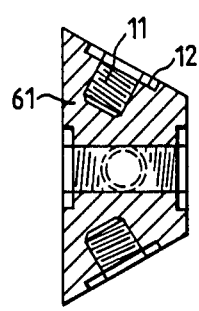
FIGS. 22 and 23 show a hemi-hexagonal connector body, FIG. 22 being a section on the line B—B of FIG. 23.
Figure 23:
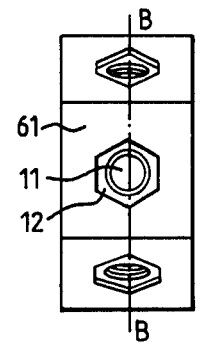

FIGS. 18a and 18b show a connector body 52a in the form of the right equilateral prism of FIG. 18 as a connector body in it own right. Again, apertures 11 and recesses 12 are provided in the faces for connection to posts or to other connector bodies as required. In addition to the connector bodies of basically triangular, cubic, and pentagonal shape, a useful further shape is the regular hexagon, together with its variant the hemi-hexagon. FIGS. 22 and 23 show a hemi-hexagon connector body 61, with apertures 11 and recesses 12 located on all faces. A second such hemi-hexagon connector body may be linked to the body 61 to form a complete hexagon.

Figure 24:
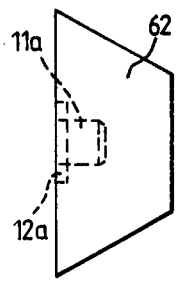
FIG. 24 shows an end cap matching a hemi-hexagonal connecting body.

FIG. 24 shows an end cap 62 which may be linked to such a hemi-hexagon body 61 using a joining arrangement of FIGS. 7 and 8 or 10 in an aperture 11a and recess 12a in conjunction with the aperture and recess in the appropriate face.

Figure 25:
FIG. 25 and 26 show a modified hemi-hexagonal connector body, with an additional modification shown dotted.
Figure 26:
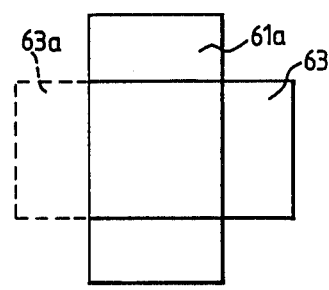
Figure 27:
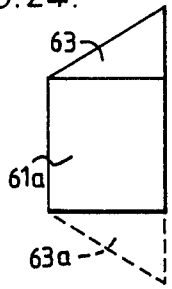
FIG. 27 is a further side view of the said additional modification.
Figure 28:
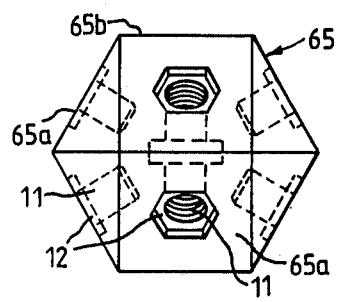
FIGS. 28 and 28a show different forms of hexagonal connector body.

FIGS. 25 and 26 show diagrammatically, with the apertures 11 and recesses 12 omitted, a modification in which a 60°/30° right triangular prism portion 63 is added to one of the end faces of a hemi-hexagon connector body 61a, either being integral therewith or joined on as previously described. FIGS. 26 and 27 show the effect of adding a second such prism portion 63a on the other end face. When a second similar modified hemi-hexagon is added, it will be seen that the composite connector body is effectively two regular hexagons in mutually perpendicular planes as illustrated in FIG. 28, which shows a connector body 65 in the form of an integral double hexagon having a total of ten faces 55a, two of which 55b are common to both hexagons, and each of which is provided with the usual aperture 11 and recess 12.

Figure 27A:
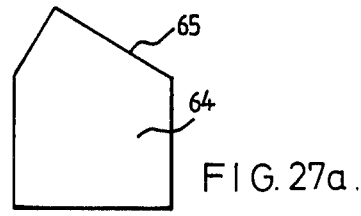
FIG. 27a is a diagrammatic showing of a modified cucic connector body.

FIG. 27a shows a cubic connector body having an integral triangular prism portion 65 on one face. In the example shown, the prism portion 65 is a 60° right angle traingle.

Figure 28A:
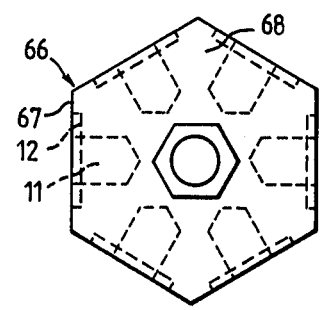

FIG. 28a shows a plain hexagonal connector body 66 having six side faces 67 and two end faces 68, each of the faces 67 and 68 having the aperture 11 and recess 12.

Figure 29:
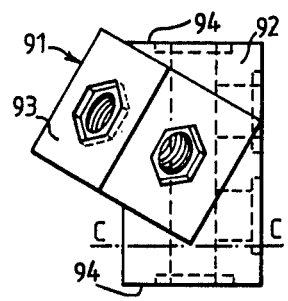
FIGS. 29 to 31 are views of a further complex shape of connector body.
Figure 30:
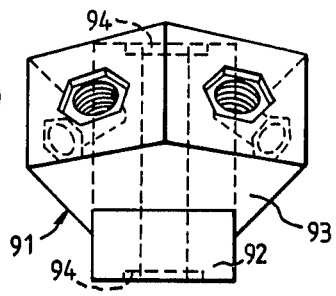
Figure 31:
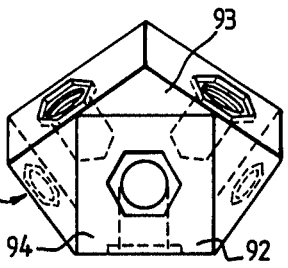

FIGS. 29, 30 and 31 show a further and more complex form of connector body 91 comprising a double cube 92 with a pentagonal prism 93 set thereon at an inclination of 30° from a normal plane C—C. A similar complex shape could be made up using the double cube and a hexagonal prism. This connector body may be used to provide in line connection through the end faces 94 of the double cube, with other frame members connected to other faces as required.

The connector bodies 1, 1a and 1b, and all variations on them, may be cast, eg die cast, from metal or alloy, or they may be moulded in plastics material. Alternatively, where greater structural strength is required, which may involve the use of steel, they may be mechined from solid. This is the preferred method of manufacture.

It will be understood that as well as supplying support points for post connectors in a frame, the connector bodies may be used to mount accessories of various types, including casters, feet, and other types of post, eg for supporting lighting gantries.

Figure 32:
FIGS. 32 and 33 show typical accessories
Figure 33:

As examples of accessories, FIG. 32 shows an eye bolt 71 with an integral spigot 72, while FIG. 33 shows a panel clip 73, also with an integral spigot 74 for fixing to a face of a connector body.

Figures 34, 35, 36:
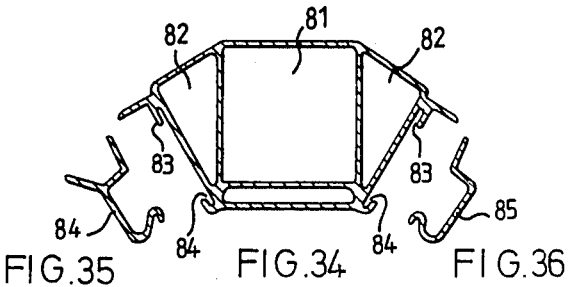
FIGS. 34, 35 and 36 show sections of a possible extruded frame member and two forms of clip for use therewith.

FIG. 34 shows a form of extrusion which may be used for a frame member with facilities for attachment of panels, glazing or other fitments. A central square section 81 of the extrusion is usable for connections to connecting posts and hence to connector bodies, and this is extended by lateral prismatic extensions 82 with external recesses 83 and 84, for co-operation with clips 84 or 85 for attachment of panels or glazing as shown in FIGS. 35 and 36.

Figure 37:
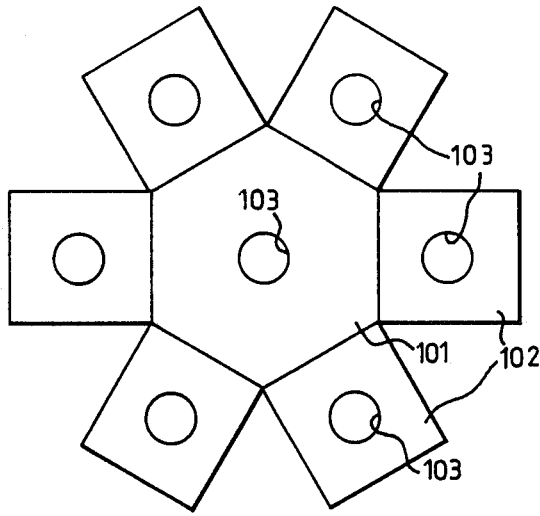
FIG. 37 shows a crown piece.

FIG. 37 shows a crown piece formed from steel. The crown piece is shown flat and comprises a central hexagonal plate 101 with square side plates 102 extending from the edges of the hexagonal plate 101. Each plate 101 and 102 has a central aperture 103 for attachment to a connecting member, and the apertures 103 may be threaded to receive a screw or may be plain. In the latter case, it is intended that a connecting member should be attached by means of a nut at the rear of the plate 101 or 102. The crown piece may be supplied flat and the side plates 102 subsequently bent to the required angle, or it may be supplied with the side plates 102 bent to preset angles to the plane of the centre plate 101, e.g. 30°, 45° or 60°. Again, the side plates are of the 1 inch (25 mm) or other modular size for conformity with the modulus of the system.

Figure 38:
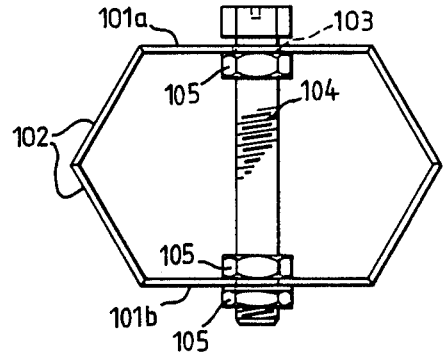
FIG. 38 shows a connector body formed from two crown pieces.

FIG. 38 shows two crown pieces joined at the outer edges of the side plates 102, by welding or by hinge connections. An adjusting bolt 104 is journalled in the apertures 103 in the top and bottom centre plates 101a and 101b. Nuts 105 on the bolt allow the centre plates 101a and 101b to move relatively to each other along the bolt 104, thereby varying the distance between them, and the angle between them and their respective side plates 102. Such an arrangement may provide a central connector body for frame members radiating out from the body.

Various other modifications may be made within the scope of the invention.

The embodiments of the invention in which an exclusive property or priviledge is claimed are defined as follows:

1. A framework system comprising a multiplicity of connector bodies, square section post connectors, and square section tubes, each of said connector bodies having a solid body portion with square faces, said square faces having central axial threaded apertures therein surrounded by hexagonal recesses in said faces, each said post connector being hollow and having a hexagonal protrusion at a first end to cooperate with a corresponding hexagonal recess in respective connector body to form-lock said post connector to said respective connector body, a threaded bolt extending through said post connector, said bolt having a hexagonal head which bears against a second end of said post connector and aligned to engage said respective threaded aperture of said respective connector body and urge said first end of said post connector into firm form-locked contact with said respective connector body, and a tube for each of said post connectors fitting snugly thereover and extending to at least adjacent said respective connector body.

2. The framework system of claim 1, in which said post connector is provided with lateral lugs which engage through apertures adjacent ends of said tubes to restrain said tube longitudinally in position arranged such that said lugs may be pressed manually inwardly from outside said tube to release said lugs from said apertures and allow said tube to slide off said post connector.

* * * * *